(12) United States Patent
Kiselev

(10) Patent No.: US 7,234,024 B1
(45) Date of Patent: *Jun. 19, 2007

(54) APPLICATION-ASSISTED RECOVERY FROM DATA CORRUPTION IN PARITY RAID STORAGE USING SUCCESSIVE RE-READS

(75) Inventor: Oleg Kiselev, Palo Alto, CA (US)

(73) Assignee: Veritas Operating Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/364,230

(22) Filed: Feb. 28, 2006

Related U.S. Application Data

(63) Continuation of application No. 10/614,306, filed on Jul. 3, 2003, now Pat. No. 7,028,139.

(51) Int. Cl.
G06F 12/00 (2006.01)
(52) U.S. Cl. .............................. 711/114; 711/4; 711/15; 711/154; 714/6
(58) Field of Classification Search ................ 711/114, 711/4, 15, 154; 714/6
See application file for complete search history.

(56) References Cited

U.S. PATENT DOCUMENTS

| 4,514,801 A | 4/1985 | Caudel et al. .............. 364/200 |
| 4,903,234 A | 2/1990 | Sakuraba et al. ............. 365/49 |
| 4,989,206 A | 1/1991 | Dunphy et al. ............. 371/10.1 |
| 5,058,003 A | 10/1991 | White ......................... 364/200 |
| 5,367,682 A | 11/1994 | Chang ......................... 395/700 |
| 5,517,632 A | 5/1996 | Matsumoto et al. ......... 395/441 |
| 5,586,291 A | 12/1996 | Lasker et al. ............... 395/440 |
| 5,590,300 A | 12/1996 | Lautzenheiser ............. 395/412 |
| 5,615,353 A | 3/1997 | Lautzenheiser ............. 395/463 |

(Continued)

FOREIGN PATENT DOCUMENTS

EP 0 709 765 A2 5/1996

(Continued)

OTHER PUBLICATIONS

Oleg Kiselev, et al., allowed U.S. Patent Application entitled "Use of Read Data Tracking and Caching to Recover From Data Corruption," U.S. Appl. No. 10/610,604, filed Jul. 3, 2003, including Specification pp. 1-17; Drawings: Figs. 1-4, 4A; & 4B on 4 sheets.

(Continued)

Primary Examiner—Stephen C. Elmore
(74) Attorney, Agent, or Firm—Campbell Stephenson LLP

(57) ABSTRACT

An apparatus or method that tracks the identity of stripe units or group of stripe units from which data has been previously read by an application program running on a computer system. In one embodiment, the present invention stores the identity of previously read stripe units or groups of stripe units in a table. If the application program requests data of one of stripe unit or groups of stripe units whose identity is stored in the table, the requested data is regenerated from parity data and data of the stripe or stripes other than the requested data. This generated data is returned to the application program rather then the existing data stored in the stripe unit groups of stripe units.

12 Claims, 5 Drawing Sheets

U.S. PATENT DOCUMENTS

| | | | |
|---|---|---|---|
| 5,664,187 A | 9/1997 | Burkes et al. | 395/621 |
| 5,809,543 A | 9/1998 | Byers et al. | 711/162 |
| 5,889,935 A | 3/1999 | Ofek et al. | 395/182.04 |
| 5,974,544 A | 10/1999 | Jeffries et al. | 713/1 |
| 6,052,797 A | 4/2000 | Ofek et al. | 714/6 |
| 6,167,494 A | 12/2000 | Cheston et al. | 711/162 |
| 6,282,670 B1 | 8/2001 | Islam et al. | 714/6 |
| 6,327,638 B1 | 12/2001 | Kirby | 711/4 |
| 6,397,292 B1 | 5/2002 | Venkatesh et al. | 711/114 |
| 6,460,122 B1 | 10/2002 | Otterness et al. | 711/154 |
| 6,574,709 B1 | 6/2003 | Skazinski et al. | 711/119 |
| 6,609,184 B2 | 8/2003 | Bradshaw et al. | 711/162 |
| 6,625,705 B2 | 9/2003 | Yanai et al. | 711/162 |
| 6,704,837 B2 | 3/2004 | Beardsley et al. | 711/114 |
| 6,721,739 B1 | 4/2004 | Mende, Jr. et al. | 707/8 |
| 2002/0099932 A1 | 7/2002 | Muro, Jr. | 712/228 |
| 2002/0120605 A1 | 8/2002 | Gagne | 707/1 |
| 2002/0188895 A1 | 12/2002 | Quach et al. | |
| 2002/0194428 A1 | 12/2002 | Green | 711/114 |
| 2003/0061240 A1 | 3/2003 | McCann et al. | 707/200 |
| 2003/0145270 A1 | 7/2003 | Holt | 714/766 |
| 2003/0167439 A1 | 9/2003 | Talagala et al. | 714/770 |
| 2003/0177306 A1 | 9/2003 | Cochran et al. | 711/114 |
| 2004/0034752 A1 | 2/2004 | Ohran | 711/161 |

FOREIGN PATENT DOCUMENTS

| | | |
|---|---|---|
| EP | 0 936 533 A2 | 8/1999 |
| EP | 1 156 419 A2 | 11/2001 |
| JP | 02058626 | 3/1990 |
| JP | 02144424 | 6/1990 |
| JP | 03211885 | 8/1991 |
| JP | 03260921 | 10/1991 |
| JP | 04024950 | 2/1992 |
| JP | 04035124 | 2/1992 |
| JP | 05050398 | 3/1993 |
| JP | 05051663 | 3/1993 |
| JP | 05069399 | 3/1993 |
| JP | 06232775 | 9/1994 |
| JP | 07071286 | 3/1995 |
| JP | 08200255 | 7/1996 |
| JP | 10007321 | 1/1998 |
| JP | 10024592 | 2/1998 |
| JP | 10170322 | 6/1998 |
| JP | 10289332 | 10/1998 |
| JP | 2003085671 | 12/2000 |
| WO | WO 91/16677 | 10/1991 |
| WO | WO 96/41261 | 12/1996 |
| WO | WO 98/45978 | 10/1998 |
| WO | WO 01/77811 | 10/2001 |
| WO | WO 02/059749 | 8/2002 |
| WO | WO 02/086653 | 10/2002 |
| WO | WO 03/003153 | 1/2003 |

OTHER PUBLICATIONS

Oleg Kiselev, et al., pending U.S. Patent Application entitled "Use of Read Data Tracking and Caching to Recover from Data Corruption," U.S. Appl. No. 11/242,216, filed Oct. 3, 2005, including Specification pp. 1-17; Drawings: Figs. 1-4, 4A; & 4B on 4 sheets.

Oleg Kiselev, et al., pending U.S. Patent Application entitled "A Method of Data Caching in Mirrored Storage," U.S. Appl. No. 10/749,862, filed Dec. 31, 2003, including Specification pp. 1-15; Drawings: Figs. 1-4 on 3 sheets.

Oleg Kiselev, et al., pending U.S. Patent Application entitled "Method of Detection of Data Corruption in Mirrored Storage," U.S. Appl. No. 10/742,129, filed Dec. 19, 2003, including Specification pp. 1-18 Drawings: Figs. 1-5, 5A and 5B on 5 sheets.

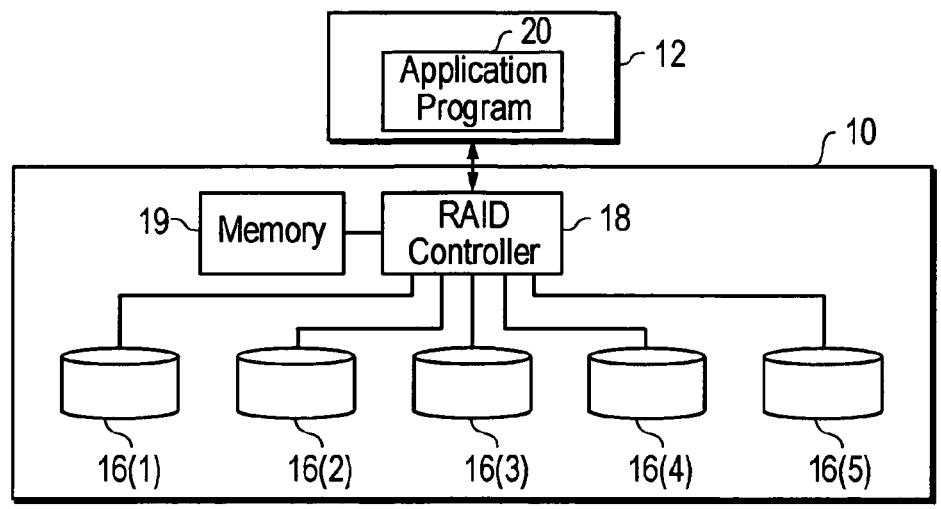
FIG. 1
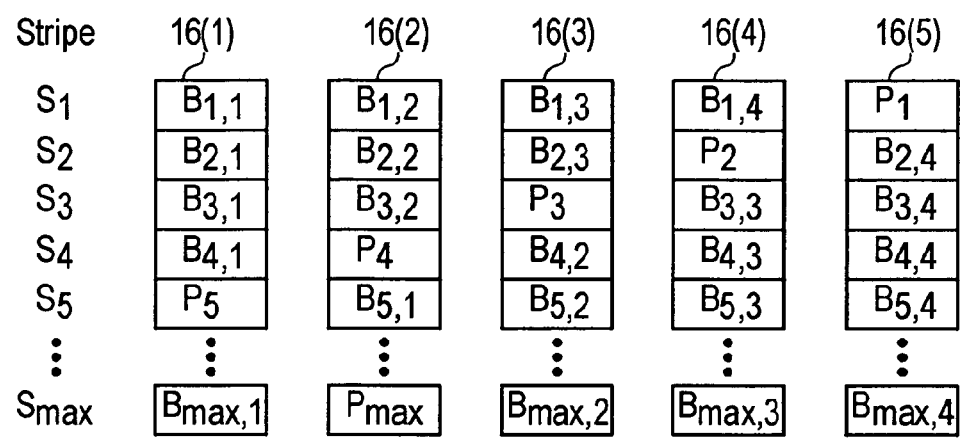
FIG. 2
| n | Stripe Unit Identity | Time Stamp | |
|---|---|---|---|
| 1 | $B_{7,3}$ | $T_{7,3}$ | |
| 2 | $B_{1,1}$ | $T_{1,1}$ | 32 |
| 3 | $B_{2,4}$ | $T_{2,4}$ | |
| 4 | $B_{4,2}$ | $T_{4,2}$ | |
| 5 | $B_{3,3}$ | $T_{3,3}$ | |
| ⋮ | ⋮ | ⋮ | |
| $n_{max}$ | $B_{4,4}$ | $T_{4,4}$ | |
FIG. 4

| n | m | First Stripe Unit Identity | Time Stamp | Bit Map | |
|---|---|---|---|---|---|
| 1 | 2 | $B_{1,3}$ | $T_{1,3}$ | 1 0 | ⟵ 62 |
| 2 | 4 | $B_{7,1}$ | $T_{2,1}$ | 1 1 1 0 | |
| 3 | 2 | $B_{3,3}$ | $T_{5,3}$ | 0 0 | |
| 4 | 3 | $B_{4,2}$ | $T_{4,2}$ | 0 0 0 | |
| 5 | 4 | $B_{1,1}$ | $T_{1,1}$ | 1 0 0 0 | |
| $n_{max}$ | 3 | $B_{1,1}$ | $T_{1,1}$ | 1 1 0 | |

The columns "m" and "First Stripe Unit Identity" are grouped under "Group Identity".

*FIG. 6*

APPLICATION-ASSISTED RECOVERY FROM DATA CORRUPTION IN PARITY RAID STORAGE USING SUCCESSIVE RE-READS

CROSS-REFERENCE TO RELATED APPLICATIONS

The present patent application is a continuation of U.S. patent application Ser. No. 10/614,306, filed on Jul. 3, 2003, now U.S. Pat. No. 7,028,139, entitled "Application-Assisted Recovery from Data Corruption in Parity RAID Storage Using Successive Re-Reads" and is incorporated by reference herein in its entirety and for all purposes.

BACKGROUND OF THE INVENTION

Redundant array of inexpensive (or independent) disks (RAID) is an evolving data storage technology that offers significant advantages in performance, capacity, reliability, and scalability to businesses that have demanding data storage and access requirements. In 1988, a paper was published by Patterson, Gibson, Katz, entitled "A Case for Redundant Arrays of Inexpensive Disks (RAID)," International Conference on Management of Data, pages 109–116, June 1988. This paper described how RAID data storage would improve the data input/output (I/O) rate over that of a comparable single disk data storage system, and how RAID data storage would provide fault tolerance, i.e., the ability to reconstruct data stored on a failed disk.

RAID data storage systems are configured according to any one of a number of "RAID levels." The RAID level specify how data is distributed across disk drives in the array. In the paper noted above, the authors describe RAID levels 1 through 5. Since the publication of the paper mentioned above, additional RAID levels have been developed.

RAID data storage systems include an array of disk drives. These disk drives may include magnetic or optical data storage disks, or combinations thereof. RAID data storage systems may also include a RAID controller, although the term RAID data storage system should not be limited to a system that includes a RAID controller. The RAID controller is an electronic circuit or series of electronic circuits that provides an interface between a host computer and the array of disk drives. From the viewpoint of the host computer, the RAID controller makes the array of disk drives look like one virtual disk drive that is very fast, very large, and very reliable.

RAID levels are typically distinguished by the benefits provided. These benefits include increased I/O performance and fault tolerance as noted above. Increased performance is achieved by simultaneous access to multiple disk drives which result in faster I/O and faster data access requests. Fault tolerance is typically achieved through a data recovery method in which data of a disk drive can be reconstructed in the event of failure of the disk drive. Fault tolerance allows the disk drive array to continue to operate with a failed disk drive.

Data recovery is accomplished, in many RAID levels, using error correction data. The error correction data is typically stored on one or more disk drives dedicated for error correction only, or distributed over several disk drives within the array. When data on a disk drive is inaccessible due to, for example, hardware or software failure, the data sought can be reconstructed using the error correction data and data from other disk drives of the array. Reconstruction can occur as data is requested. Further, reconstruction can occur without a substantial degradation in system I/O performance. RAID controllers may reconstruct all data of a failed disk drive onto a spare disk drive, so that the data storage system can survive another disk drive failure.

RAID data storage systems employ data interleaving in which data is distributed over all of the disk drives in the array. Data interleaving usually takes form in data "striping" in which data to be stored is broken down into components called "stripe units" which are then distributed across the array of disk drives. A stripe unit is typically defined as a bit, byte, block, or other unit of data. A "stripe" is a group of corresponding stripe units. Each disk drive in the array stores one stripe unit from each stripe. To illustrate, RAID level 5 uses data interleaving by striping data across all disk drives. RAID level 5 also distributes error correction data across all disk drives.

Reconstruction of data in RAID data storage systems using error correction data is a procedure well known in the art. Error correction data usually takes form in parity data. Parity data for each stripe is typically calculated by logically combining data of all stripe units of the stripe. This combination is typically accomplished by an exclusive OR (XOR) of data of the stripe units. For a RAID level 5 data storage system having N disk drives, N-1 of the N disk drives will receive a stripe unit of the stripe, and the Nth disk drive will receive the parity data for the stripe. For each stripe, the disk drive receiving the parity data rotates such that all parity data is not contained on a single disk drive. I/O request rates for RAID level 5 are high because the distribution of parity data allows the system to perform multiple read and write functions at the same time.

As noted, should a disk drive fail on a RAID data storage system, the RAID controller can reconstruct data using corresponding parity data. Using parity data reconstruction algorithms well known in the art, data of a stripe unit in the failed disk drive can be reconstructed as a function of the parity data and data of stripe units corresponding to the stripe unit of the failed disk drive.

Disk drive failure is one problem in RAID data storage systems. Another problem relates to data corruption. Data corruption has many sources. To illustrate, suppose the RAID controller of a data storage system receives new data $D_{new}$ from a computer system coupled thereto. This new data $D_{new}$ is to replace existing data $D_{old}$ of a stripe unit $B_1$ of a stripe S. Before the RAID controller overwrites the existing data $D_{old}$ of the stripe unit $B_1$, the RAID controller must update the exiting parity $P_{old}$ for stripe S. To this end, the RAID controller reads the existing parity $P_{old}$ for stripe S. Thereafter, the RAID controller generates a new parity $P_{new}$ for stripe S as a function of the existing parity $P_{old}$. Thereafter RAID controller successfully overwrites the existing parity $P_{old}$ for stripe S with the newly generated parity $P_{new}$.

Unfortunately, because of improper operation of hardware or software, existing data $D_{old}$ of the stripe unit $B_1$ is not overwritten with the new data $D_{new}$. For example, the new data $D_{new}$ is inadvertently written to a disk track adjacent to the disk track that stores the existing data $D_{old}$ of the stripe unit. When this happens, two tracks of the disk drive contain invalid or corrupted data. But the RAID controller believes the existing data $D_{old}$ of the stripe unit has been properly overwritten with the new data $D_{new}$. If the RAID controller receives a subsequent request from the computer system to read data of stripe unit $B_1$, $D_{old}$ will be returned rather than $D_{new}$. Other manifestations of data corruption can be caused by the failure of software or hardware to write $D_{new}$ at all, or write data that got corrupted sometime during processing and transmission from the computer system to the disk media or from the disk media to the computer system.

The computer system requesting the data may perform a checking algorithm and recognize that the returned data is not what is expected. If the computer recognizes that the data returned is invalid, the computer system may send a second request for the same data. If data is correct on the disk media and got corrupted during transmission to the computer system, this second request (re-read) may return correct data. Also, if the RAID system stored data as RAID-1 (mirroring), it has a second complete copy of the data (alternate mirror) and may be able to obtain correct data from the alternate mirror. Unfortunately, a parity RAID controller has no readily available alternate copy of the data. If data is corrupted on the disk media in one of the ways described earlier, the controller will once again return corrupted data in response to the second request.

SUMMARY OF THE INVENTION

The present invention relates to an apparatus or computer executable method that tracks the identity of stripe units or group of stripe units from which data has been previously read by an application program running on a computer system. In one embodiment, the present invention stores the identity of previously read stripe units or groups of stripe units in a table. If the application program requests data of one of stripe unit or groups of stripe units whose identity is stored in the table, the requested data is regenerated from parity data and data of the stripe or stripes other than the requested data. This generated data is returned to the application program rather then the existing data stored in the stripe unit or groups of stripe units.

BRIEF DESCRIPTION OF THE DRAWINGS

The present invention may be better understood, and its numerous objects, features, and advantages made apparent to those skilled in the art by referencing the accompanying drawings.

FIG. 1 is a block diagram of a RAID-5 data storage system employing one embodiment of the present invention;

FIG. 2 illustrates the distribution of volume data in the data storage system of FIG. 1;

FIG. 4 is a block diagram of a table that stores identities of previously read stripe units;

FIG. 6 is a block diagram of a table that stores identities of previously read stripe unit groups;

The use of the same reference symbols in different drawings indicates similar or identical items.

DETAILED DESCRIPTION

Figure 3:
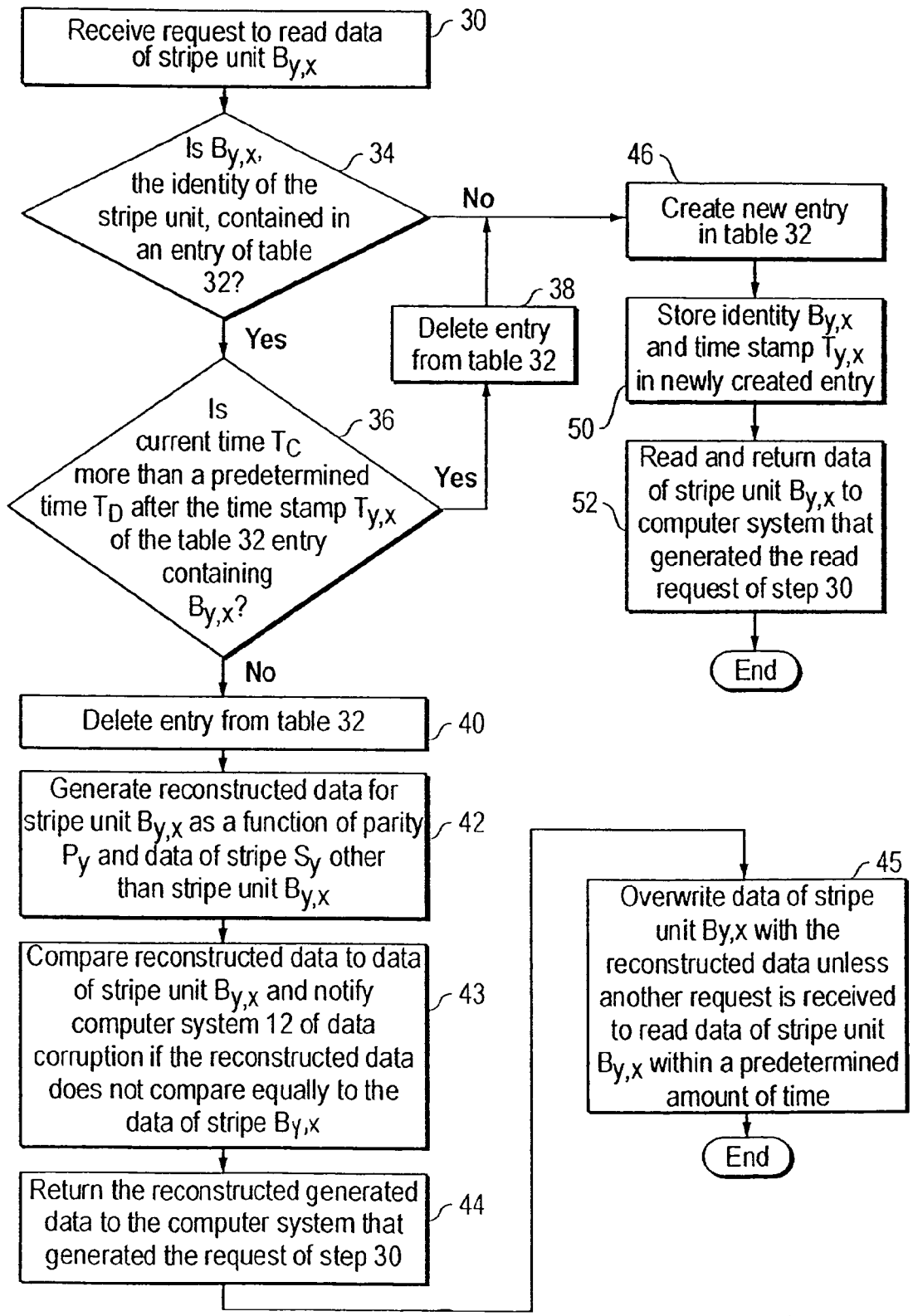
FIG. 3 is a flow chart illustrating operational aspects of responding to a request to read data in the data storage system of FIG. 1.

The present invention provides for application assisted recovery from corruption of data using successive rereads. The present invention will be described with reference to correcting corrupted data in a volume stored in a RAID level 5 data storage system, it being understood that the present invention should not be limited thereto. FIG. 1 shows relevant components of an exemplary RAID level 5 data storage system 10 employing one embodiment of the present invention. Data storage system 10 is coupled to a computer system 12 and configured to receive requests to read data therefrom. The term coupled should not be limited to what is shown in FIG. 1. Two devices, e.g., data storage system 10 and computer system 12, may be coupled together via a third device (not shown). Although not shown, data storage system 10 may be coupled to other computer systems and 10/195,679 entitled "Automated Recovery From Data Corruption Of Data Volumes In RAID Storage" filed Jul. 1, 2003, describes additional data storage systems and is incorporated herein by reference in its entirety.

Data storage system 10 includes disk drives 16(1)–16(5), each of which is individually coupled to a RAID controller 18. The present invention can be implemented with a system that includes more or fewer disk drives than that shown in FIG. 1. RAID controller 18 is capable of simultaneously reading data from one or a number of disk drives 16(1)–16(5) in response to a request received from computer system 12. RAID controller 18 may take form in a computer system having one or more processors that process data in accordance with instructions stored in a computer readable medium. The present invention as described herein can be implemented by RAID controller 18 executing instructions stored in a computer readable medium such as memory 19.

FIG. 2 illustrates, in block diagram form, the distribution of the volume data in storage system 10. More particularly, FIG. 2 includes data stripes $S_1$–$S_{max}$ distributed among disk drives 16(1)–16(5). Each stripe $S_y$ includes four data stripe units identified as $B_{y,1}$–$B_{y,4}$. Each stripe unit $B_{y,1}$–$B_{y,4}$ includes a bit, byte, block, or other unit of volume data.

Each stripe $S_y$ also includes error correction data $P_y$. Correction data $P_y$ is generated by RAID controller 18 as a function of data in stripe units $B_{y,1}$–$B_{y,4}$ according to well known error correction algorithms. For purposes of explanation, RAID controller 18 generates error correction data $P_y$ according to well known parity data generation schemes. In one embodiment, parity data $P_y$ is generated by XORing data of stripe units $B_{y,1}$–$B_{y,4}$. RAID controller 18 using well known reconstruction algorithms can reconstruct data of a stripe unit $B_{y,x}$ as a function of parity data $P_y$ and data of stripe units $B_{y,1}$–$B_{y,4}$ other than $B_{y,x}$.

Computer system 12 executes an application program that generates a request to read data from the data volume in storage system 10. The read request is transmitted to RAID controller 18. In turn, RAID controller 18 reads data sought by the read request from one or more stripe units in disk drives 16(1)–16(5). RAID controller 18 returns the read data to computer system 12. Computer system 12 checks the validity of the data returned from data storage system 10. If the data returned is found invalid or corrupt, computer system 12 will generate a second request for the same data. Without the present invention, RAID controller 18 may read and return the same corrupted data to computer system 12. RAID controller 18, operating in accordance with the present invention, does not return the same data in response to receiving the second request; rather, RAID controller 18 will return regenerated data that may be confirmed as valid once received by computer system 12.

FIG. 3 illustrates operational aspects of RAID controller 18 operating in accordance with one embodiment of the invention. In step 30, RAID controller 18 receives a first request from computer system 12 to read data. For purposes of explanation, the data sought by the read request is contained in stripe unit $B_{y,x}$. The read request may include an identification of the data sought. In one embodiment, the identification includes a starting address and a quantity of data to be read from memory beginning at the starting address. RAID controller 18 may include a file system and/or data distribution system that identifies one or more stripe units that contains the data sought to be read based on the identification of the read request.

RAID controller 18 accesses table 32 shown in FIG. 4 using $B_{y,x}$, the identification of the stripe unit that contains data sought in the read request. Table 32 contains the identity of stripe units that were previously accessed by read requests from computer system 12. As an aside, a separate table 32 could exist for each computer system coupled to data storage system 10. However, for purposes of explanation, it will be presumed that only computer system 12 is coupled to data storage system 10.

As shown, table 32 includes $n_{max}$ entries. Each entry n of table 32 includes a stripe unit identity that identifies previously read stripe units. For example, entry 3 contains $B_{2,4}$ thus indicating that data was read from stripe unit $B_{2,4}$ by computer system 12 prior to RAID controller 18 receiving the read request of step 30. Additionally, each entry includes a time stamp identifying the time when the entry was created in table 32. For example, entry 3 of table 3 contains time stamp $T_{2,4}$, thus indicating that entry 3 was created at time $T_{2,4}$. Table 32 is stored in memory of RAID controller 18 or elsewhere. RAID controller 18 has access to read from or write to entries of table 32. Each entry of table 32 is created by RAID controller 18 as will be more fully described below. Further, as described below RAID controller 18 can delete any entry of table 32.

As noted above, RAID controller 18 accesses table 32 using $B_{y,x}$, the identity of the stripe unit that contains the data sought by the request of step 30. In step 34, RAID controller 18 determines whether $B_{y,x}$ is contained in a table entry. If no entry in table 32 contains $B_{y,x}$, the process proceeds to step 46 where RAID controller 18 creates a new entry in table 32. In step 50, RAID controller 18 stores $B_{y,x}$ into the newly created entry. Also, in step 50, RAID controller stores the current time as the time stamp $T_{y,x}$ in the newly created entry. Thereafter in step 52, RAID controller 18 returns data of stripe unit $B_{y,x}$ to computer system 12, and the process ends.

If RAID controller 18 determines in step 34 that table 32 includes an entry matching $B_{y,x}$, then the process proceeds to step 36 where RAID controller compares the current time $T_c$ with time stamp $T_{y,x}$ of the entry containing $B_{y,x}$. If current time $T_c$ is more than a predetermined amount of time $T_D$ greater than $T_{y,x}$, the entry is deleted from table 32 as being stale, and the process proceeds to step 46. If, in step 36 the entry is not stale (i.e., current time $T_c$ is not more than a predetermined amount of time $T_D$ greater than $T_{y,x}$), reconstructed data is generated for stripe unit $B_{y,x}$ using parity $P_y$ and data of stripe $S_y$ other than stripe unit $B_{y,x}$, as shown in step 42. The reconstructed data of stripe unit $B_{y,x}$ is returned to the computer system in step 44. Optionally, the reconstructed data is compared with the existing data $B_{y,x}$, and a notification is sent to computer system 12 if the reconstructed data does not compare equally. Optionally, old data of stripe unit $B_{y,x}$ is overwritten with the reconstructed data.

Figure 5:
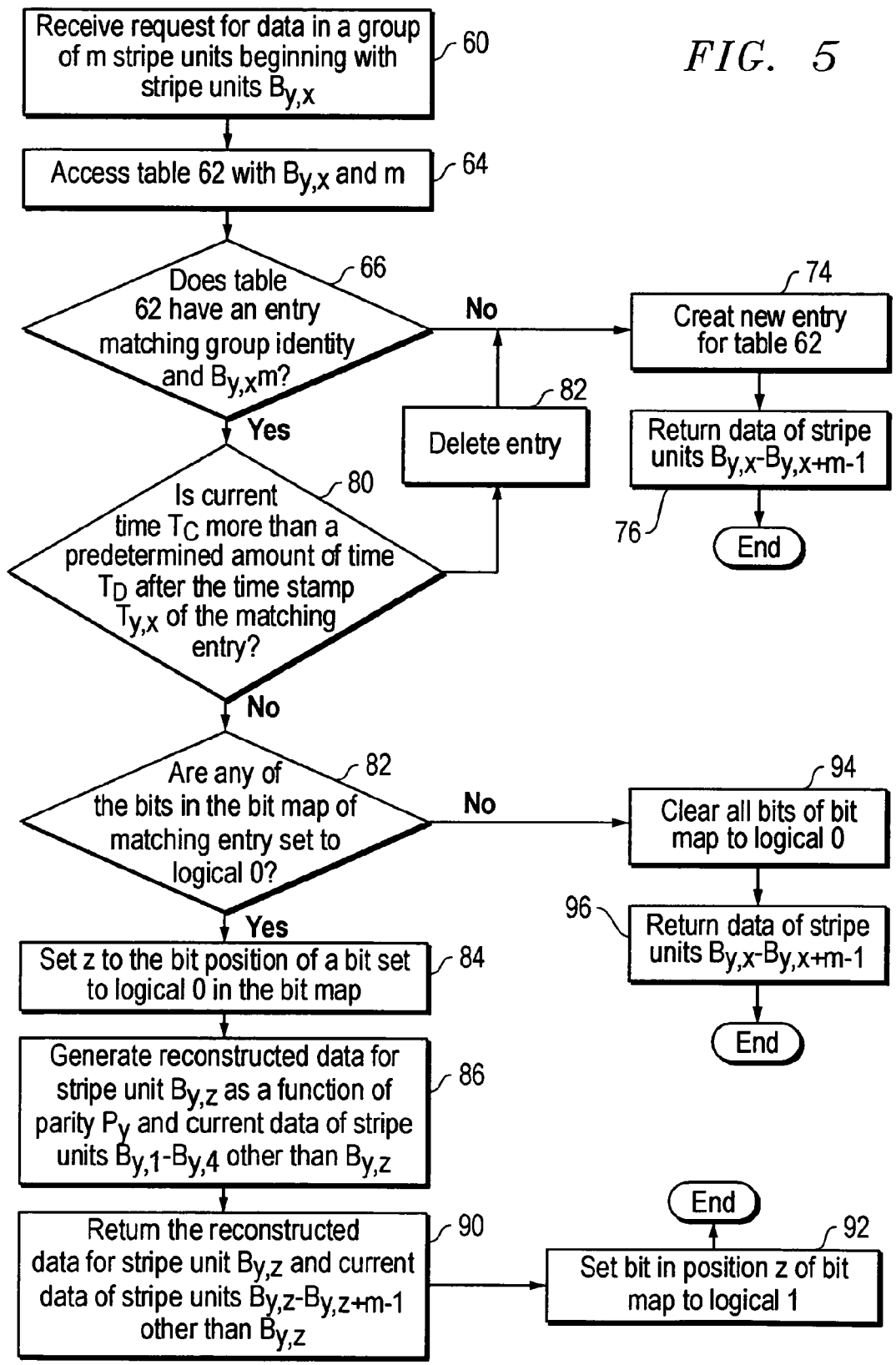
FIG. 5 is a flow chart illustrating operational aspects of responding to a request to read data in the data storage system of FIG. 1.
Figure 7:
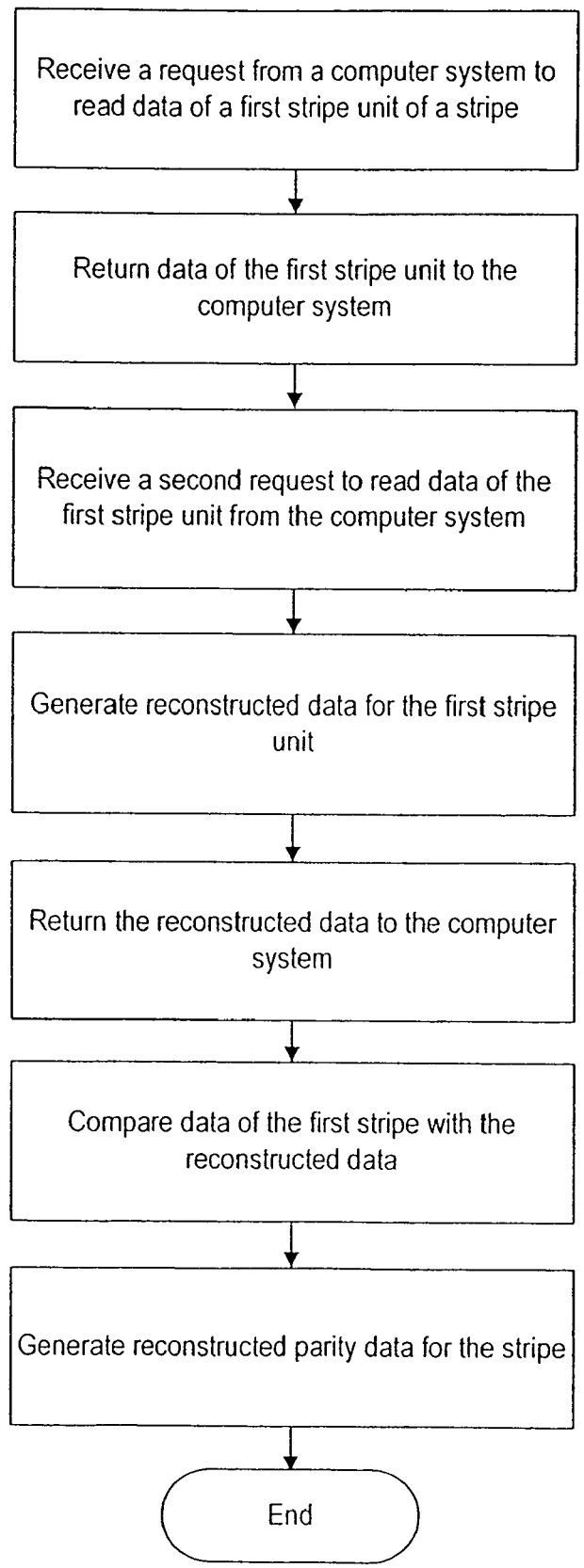
FIG. 7 is a flow chart illustrating an embodiment of the present invention.

The flow chart of FIG. 3 illustrates operational aspects of responding to a request to read data of one stripe unit $B_{y,x}$. Computer system 12 may generate a request to read data of more than one stripe unit. FIG. 5 illustrates operational aspects of responding to a request to read data of a group of stripe units of stripe $S_y$. In step 60, RAID controller 18 receives a request to read data that is contained in a group consisting of m stripe units. $B_{y,x}$ is the first stripe unit of the group that contains the requested data. For purposes of explanation, stripe unit groups are identified by the number of stripe units in the group and the first stripe unit of the group.

In response to receiving the request in step 60, RAID controller 18 accesses table 62 shown in FIG. 6. Table 62 contains the identity of stripe unit groups that were previously read by computer system 12. As an aside, a separate table 62 could exist for each computer system coupled to data storage system 10. Table 62 is stored in memory of RAID controller 18 or elsewhere. Each entry of table 62 is created by RAID controller 18 as will be more fully described below. Further, as described below RAID controller 18 can delete any entry of table 62. RAID controller 18 can read from or write to any of the entries of table 62.

As shown in FIG. 6, table 62 includes $n_{max}$ entries. Each entry includes a group identity of a previously read group of stripe units. The group identity consists of the quantity of stripe units in the group and the identity of the first stripe unit of the group. For example, entry 4 of table 62 identifies a group of 3 stripe units beginning with stripe unit of $B_{4,2}$. Entry 4 indicates that data was previously read from the group of stripe units $B_{4,2}$, $B_{4,3}$, and $B_{4,4}$ by computer system 12 prior to RAID controller 18 receiving the read request of step 60.

Each entry in table 62 further includes a time stamp identifying the time when the entry was created in table 62. For example, entry 4 of table 62 contains $T_{4,2}$, thus indicating that entry 4 was created at time $T_{4,2}$. Lastly, each entry in table 62 includes a bit map. The numbers of bits in the map may vary from entry to entry. However, the number of valid bits in each bit map equals the number of stripe units in the corresponding group. Each valid bit of the map corresponds to a respective stripe unit in the group. For example, the bit map in entry 4 consists of first, second, and third bits corresponding to stripe units $B_{4,2}$, $B_{4,3}$, and $B_{4,4}$, respectively. RAID controller 18 can set the state of each bit. As will be more fully described below, the state of the bit indicates whether data of its corresponding stripe unit has been regenerated in the past.

In step 66 of FIG. 5, RAID controller 18 determines whether the group identity of any of the entries of table 62 matches the identity of the group of stripe units that contain the data requested in step 60. In other words, RAID controller 18 determine whether any entry contains a first stripe unit identity and group quantity equal to $B_{y,x}$ and m, respectively. If, in step 66, RAID controller determines table 62 lacks a matching entry, the process proceeds to step 74 where RAID controller 18 creates a new table entry in table 62. RAID controller 18 writes the group identity corresponding to the request of step 60 into the newly created entry. RAID controller 18 will also store the current time $T_c$ as time stamp in the new entry. Lastly, RAID controller creates an m-bit bit map in the new entry, each bit of which is initially set to logical zero. In step 76, data is read from stripe units $B_{y,x}$–$B_{y,x+m-1}$ and returned to computer system 12.

If table 62 does include a matching entry (i.e., an entry containing stripe unit quantity m and first stripe unit identity $B_{y,x}$ where x takes on the value of the first unit of the set of m units) in step 66, the process proceeds to step 80 where RAID controller 18 compares the current time $T_c$ with $T_{y,x}$ of the matching table entry. If current time $T_c$ is more than a predetermined amount of time $T_D$ after $T_{y,x}$, the matching entry is deleted from table 62 as being stale, and the process proceeds to step 74. If, in step 80, time $T_c$ is less than a predetermined amount of time $T_D$ after $T_{y,x}$, the matching entry is not stale, and the process proceeds to step 84.

In step 84, RAID controller determines whether any the bit of bit map in the matching entry is set to logical zero. If at least one bit is set to logical zero, the process proceeds to step 84 where variable z is set to the position of a bit set to logical zero in the bit map of the matching entry. In step 86, reconstructed data is generated for stripe unit $B_{y,z}$ as a function of parity data $P_y$ and data of stripe units $B_{y,1}$–$B_{y,4}$ other than $B_{y,z}$. In step 90, the reconstructed data and data of stripe units $B_{y,x}$–$B_{y,x+m-1}$, other than the old data for stripe unit $B_{y,z}$, is returned to the computer system 12 as a reply to the request in step 60. Thereafter, in step 92, RAID controller sets the bit in position z of the bit map to logical 1. If this returned data is deemed valid by computer system 12, no new requests for the same data is generated by computer system 12.

If in step 82 RAID controller 82 determines that all bits of the bit map in the matching entry of table 62 are set to logical one, then the process proceeds to step 94 where RAID controller 18 clears each bit of the bit map to logical zero. Thereafter, in step 96 RAID controller 18 returns data of stripe units $B_{y,x}$–$B_{y,x+m-1}$ to computer system 12 as a reply to the request in step 60.

Optionally, RAID controller 18 may save a copy of the reconstructed data in step 86. RAID controller may also save the current value of z set in step 84. The current value of z may be saved as an additional component of the entry in table 62 that matches the identity of the group of stripe units that contain the data requested in step 60.

RAID controller 18, before or after the entry deletion step 82, may overwrite old data for stripe unit $B_{y,z}$ with the saved, reconstructed data, where z is defined by the value stored in the matching entry.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

I claim:

1. In a RAID data storage system, a method comprising:
   receiving a first request to read data of a first stripe unit of a stripe, wherein the first request is received from a computer system in data communication with the RAID data storage system;
   returning data of the first stripe unit to the computer system in response to receiving the first request;
   receiving a second request to read data of the first stripe unit, wherein the second request is received from the computer system;
   generating reconstructed data for the first stripe unit in response to receiving the second request;
   returning the reconstructed data to the computer system;
   comparing data of the first strip unit with the reconstructed data;
   generating reconstructed parity data for the stripe in response to comparing data of the first strip unit with the reconstructed data.

2. The method of claim 1 wherein the reconstructed parity data is generated as a function of all stripe units of the stripe.

3. The method of claim 2 further comprising writing the reconstructed parity data to a parity block of the stripe.

4. In a RAID data storage system, a method comprising:
   receiving a first request to read data of a first stripe unit of a stripe, wherein the first request is received from a computer system in data communication with the RAID data storage system;
   generating reconstructed data for the first stripe unit in response to receiving the first request;
   comparing data of the first stripe unit with the reconstructed data.

5. The method of claim 4 further comprising notifying the computer system of data inconsistency if the comparison shows the data in first stripe unit is different from the reconstructed data.

6. The method of claim 4 wherein the reconstructed data is generated as a function of error correction data and data of stripe units of the stripe other than the first stripe unit.

7. The method of claim 4 further comprising overwriting data for the first stripe unit with the reconstructed data unless the RAID data storage system receives another request to read data of the first stripe unit within a predetermined amount of time.

8. The method of claim 4 further comprising returning the reconstructed data to the computer system.

9. A computer readable medium storing instructions executable by a first computer system in a RAID data storage system, wherein the RAID data storage system comprises a stripe, wherein the stripe comprises a plurality of stripe units including a first stripe unit, wherein the first computer system performs a method in response to executing instructions stored on the computer readable medium, the method comprising:
   generating reconstructed data for the first stripe unit in response to the RAID data storage system receiving a first request to read data of a first stripe unit of a stripe, wherein the first request is received from a second computer system in data communication with the RAID data storage system;
   comparing data of the first stripe unit with the reconstructed data;
   returning the reconstructed data to the computer system.

10. The computer readable medium of claim 9 wherein the method further comprises notifying the computer system of data inconsistency if the comparison shows the data in first stripe unit is different from the reconstructed data.

11. The computer readable medium of claim 9 wherein the reconstructed data is generated as a function of error correction data and data of stripe units of the stripe other than the first stripe unit.

12. The computer readable medium of claim 9 wherein the method further comprises overwriting data for the first stripe unit with the reconstructed data unless the RAID data storage system receives another request to read data of the first stripe unit within a predetermined amount of time.

* * * * *